(12) United States Patent
Okada et al.

(10) Patent No.: US 7,948,507 B2
(45) Date of Patent: May 24, 2011

(54) MULTI-PRIMARY COLOR DISPLAY DEVICE

(75) Inventors: Yoshihiro Okada, Minamiashigara (JP);
Kazunari Tomizawa, Soraku-gun (JP);
Kenji Nakamura, Chiryu (JP); Shoji Okazaki, Kameyami (JP)

(73) Assignee: Sharp Kabushiki Kaisha, Osaka (JP)

( * ) Notice: Subject to any disclaimer, the term of this patent is extended or adjusted under 35 U.S.C. 154(b) by 1134 days.

(21) Appl. No.: 11/573,737

(22) PCT Filed: Jun. 7, 2005

(86) PCT No.: PCT/JP2005/010416
§ 371 (c)(1),
(2), (4) Date: Feb. 15, 2007

(87) PCT Pub. No.: WO2006/018926
PCT Pub. Date: Feb. 23, 2006

(65) Prior Publication Data
US 2007/0268208 A1 Nov. 22, 2007

(30) Foreign Application Priority Data
Aug. 19, 2004 (JP) ................................. 2004-240020

(51) Int. Cl.
*G09G 3/36* (2006.01)
*G09G 5/02* (2006.01)
(52) U.S. Cl. ............................ 345/695; 345/698; 345/88
(58) Field of Classification Search .................... 345/55, 345/690, 695, 698; 349/106, 108, 109, 111; 313/500, 169.3
See application file for complete search history.

(56) References Cited

U.S. PATENT DOCUMENTS

| 4,800,375 | A | 1/1989 | Silverstein et al. |
| 6,919,681 | B2* | 7/2005 | Cok et al. .................. 313/500 |
| 7,248,271 | B2* | 7/2007 | Credelle et al. ............ 345/695 |
| 7,492,379 | B2* | 2/2009 | Credelle et al. ............ 345/695 |
| 7,646,430 | B2* | 1/2010 | Brown Elliott et al. ...... 348/458 |
| 2003/0146893 | A1 | 8/2003 | Sawabe |
| 2003/0184569 | A1 | 10/2003 | Koga et al. |
| 2004/0046725 | A1 | 3/2004 | Lee |
| 2005/0134785 | A1 | 6/2005 | Roth et al. |
| 2005/0270444 | A1* | 12/2005 | Miller et al. ............... 349/108 |

FOREIGN PATENT DOCUMENTS

JP    09-251160 A    9/1997

(Continued)

OTHER PUBLICATIONS

Official communication issued in the corresponding International Application No. PCT/JP2005/010416, mailed on Aug. 30, 2005.

(Continued)

*Primary Examiner* — Kevin M Nguyen
(74) *Attorney, Agent, or Firm* — Keating & Bennett, LLP

(57) ABSTRACT

A display device which exhibits functional effects in which color separation between sub-pixels constituting a pixel is hardly recognized and white line display is easily recognized as one line, in enlargement of the color reproduction range in image display using multi-primary colors, and thereby improves display quality, and provides a liquid crystal display device including such a display device. The display device displays an image constituted by pixels each including sub-pixels of four or more colors, wherein the pixels constituting the display device mainly include a pixel arranging a sub-pixel of a color having the highest brightness value in a central region of the pixel.

2 Claims, 14 Drawing Sheets

FOREIGN PATENT DOCUMENTS

| | | |
|---|---|---|
| JP | 10-307205 A | 11/1998 |
| JP | 2001-209047 A | 8/2001 |
| JP | 2001-306023 A | 11/2001 |
| JP | 2001-343636 A | 12/2001 |
| JP | 2003-288058 A | 10/2003 |
| JP | 2003-295160 A | 10/2003 |
| JP | 2004-102292 A | 4/2004 |
| JP | 2004-152737 A | 5/2004 |
| WO | 02/101644 A2 | 12/2002 |
| WO | 03/088203 A1 | 10/2003 |

OTHER PUBLICATIONS

SID sokuhou, online, May 26, 2004, Nikkei Business Publications, Inc., URL:http://ne.nikkeibp.co.jp/members/NEWS/20040526/103584.

* cited by examiner

Fig.1-a
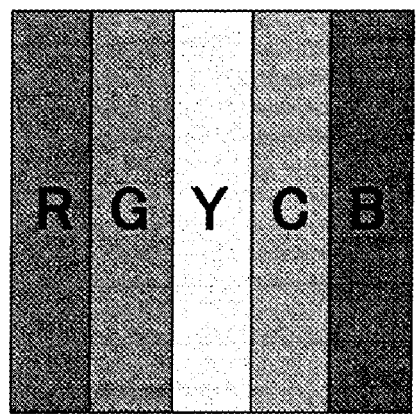
Fig.1-b
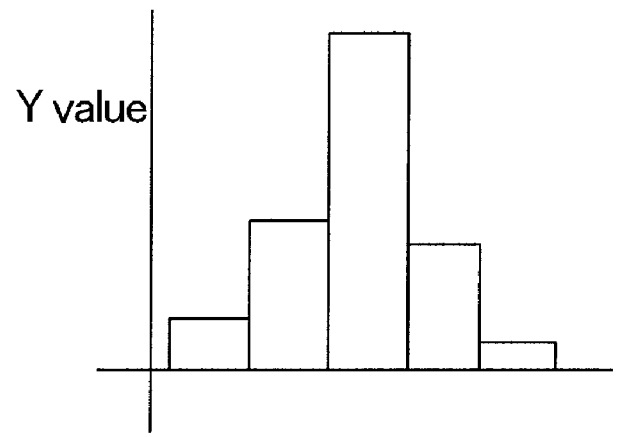
Fig.1-c
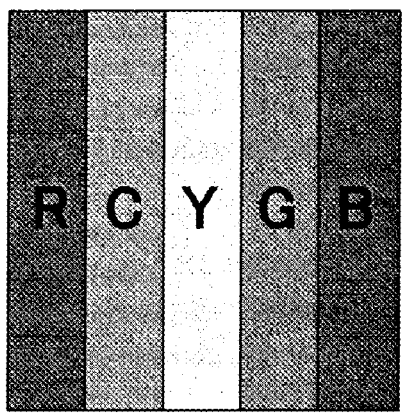

Fig.1-d
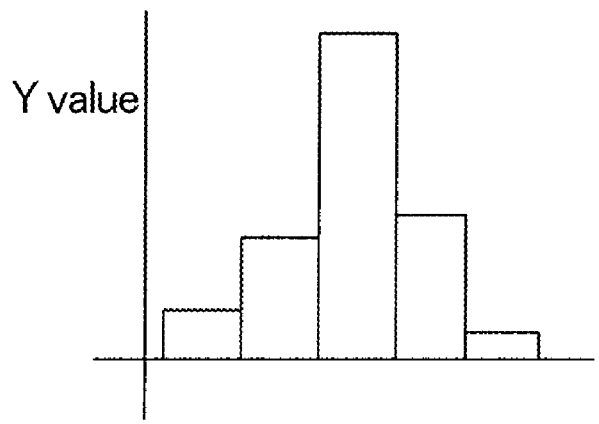
Fig.2-a
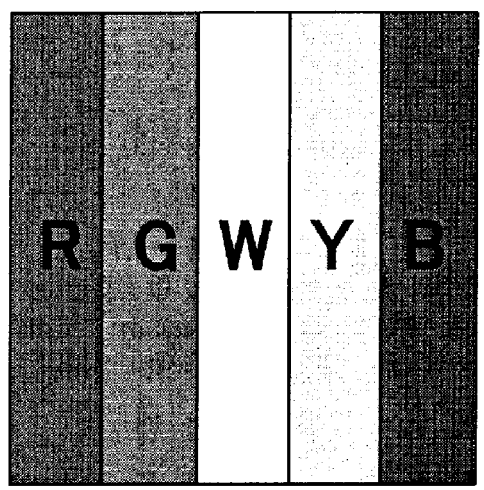
Fig.2-b
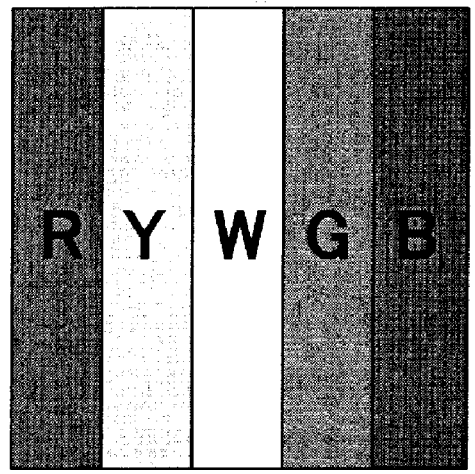

Fig.3-a
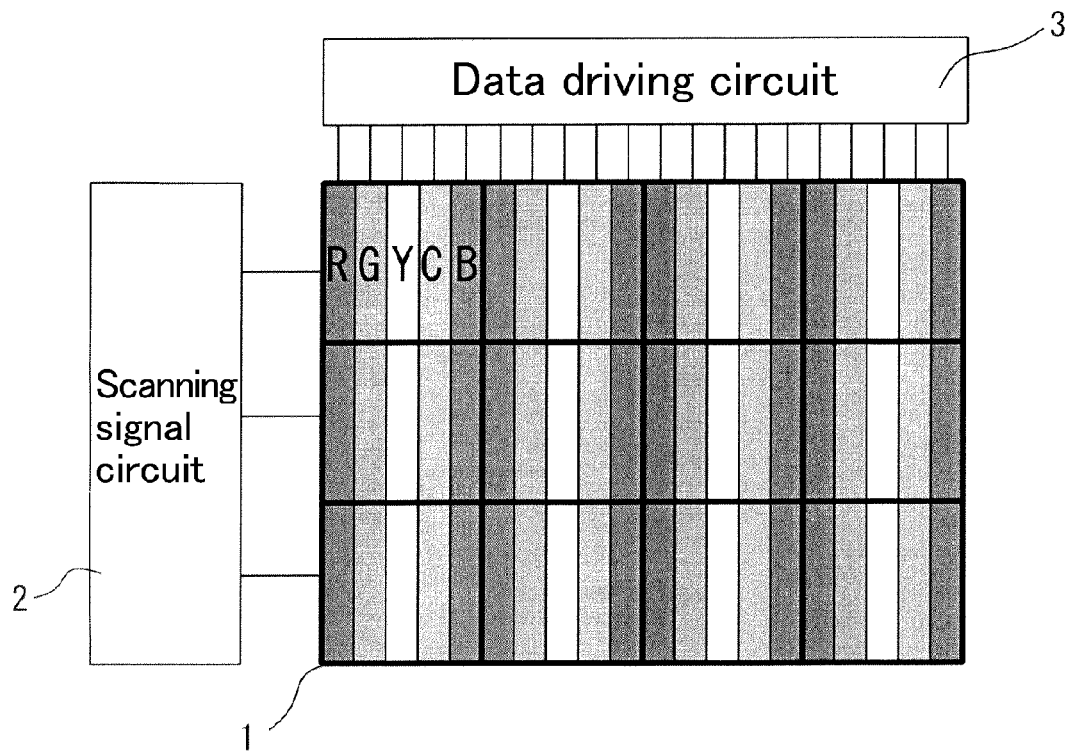
Fig.3-b
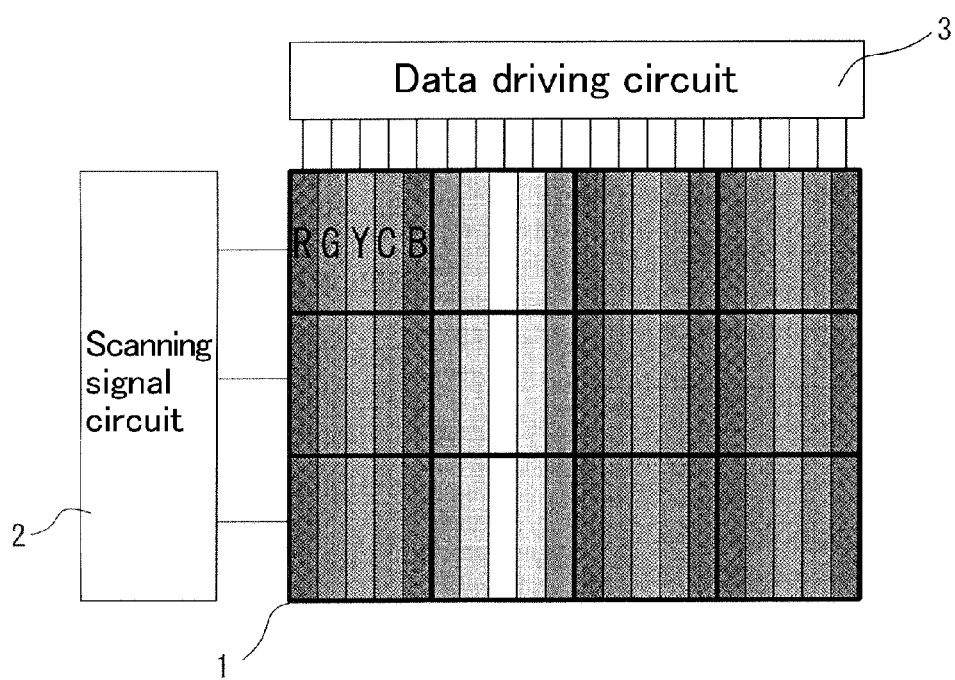

Fig.3-c
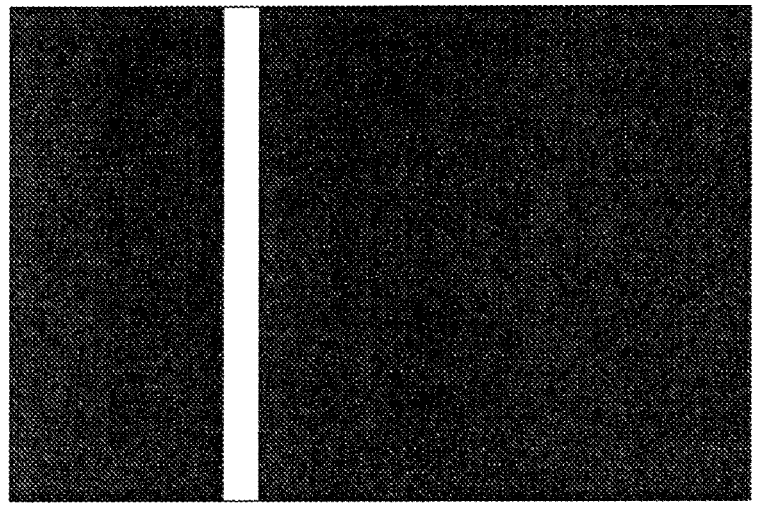
Fig.4-a
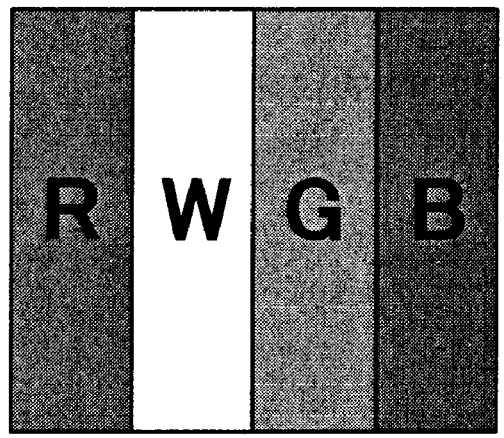
Fig.4-b
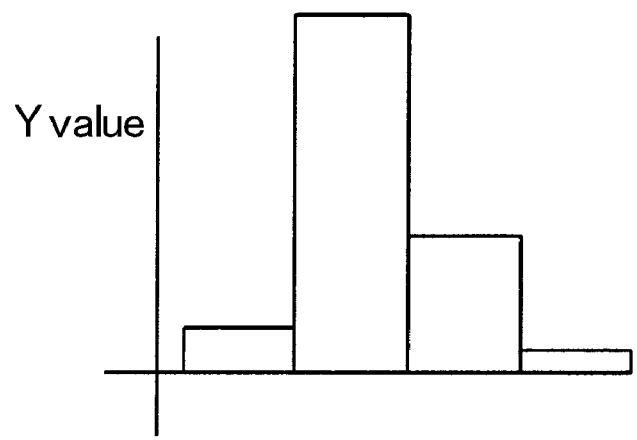

Fig.4-c
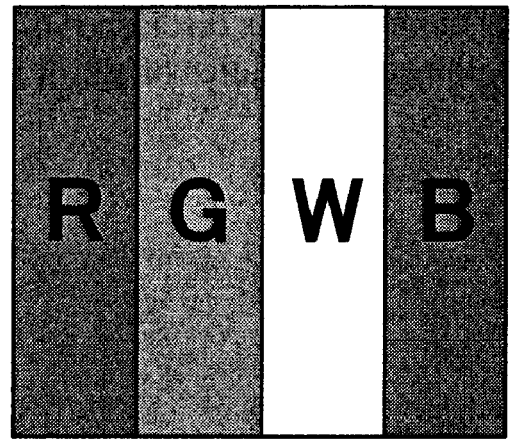
Fig.4-d
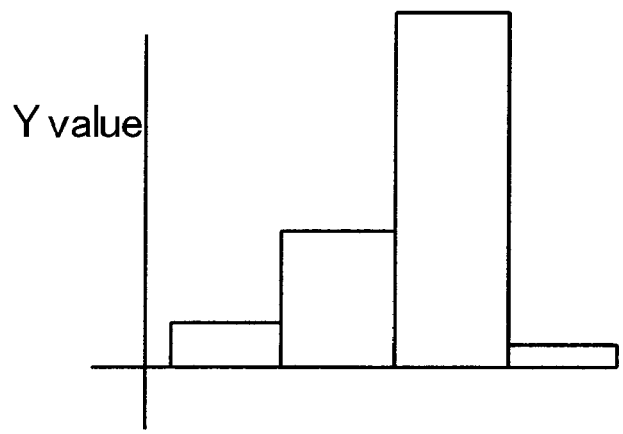
Fig.5-a
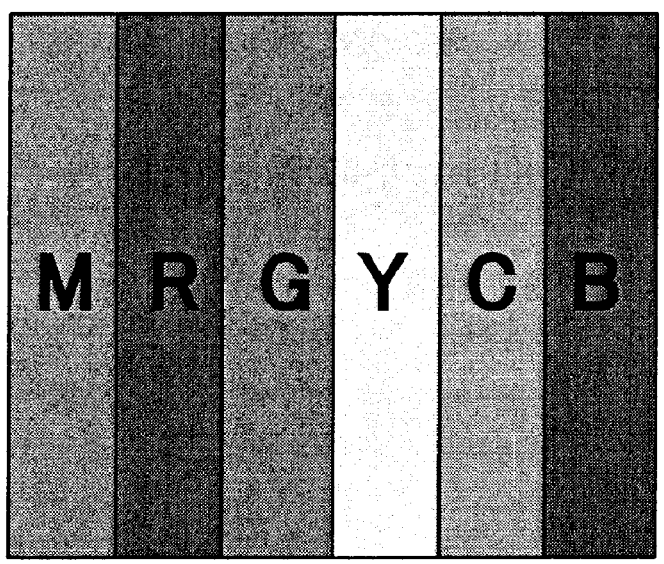

Fig.5-b
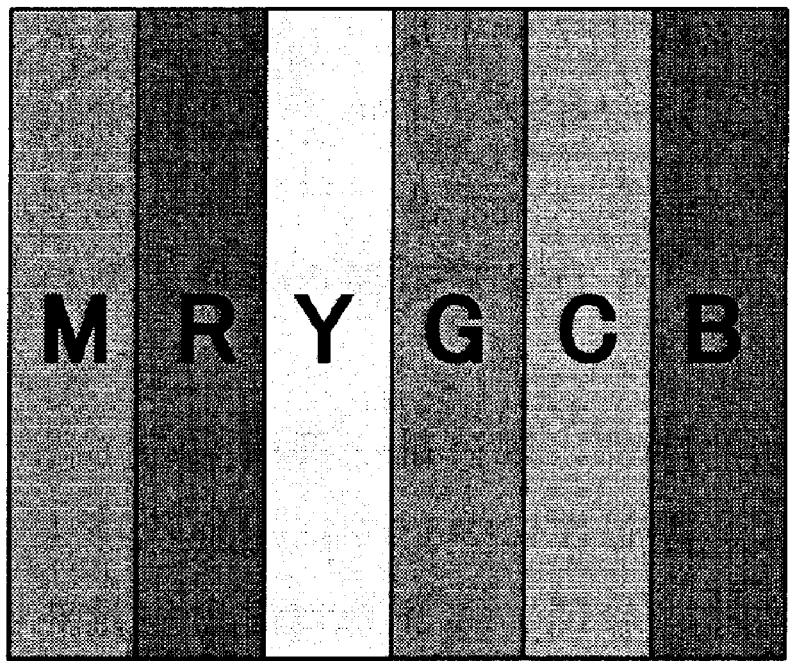
Fig.6
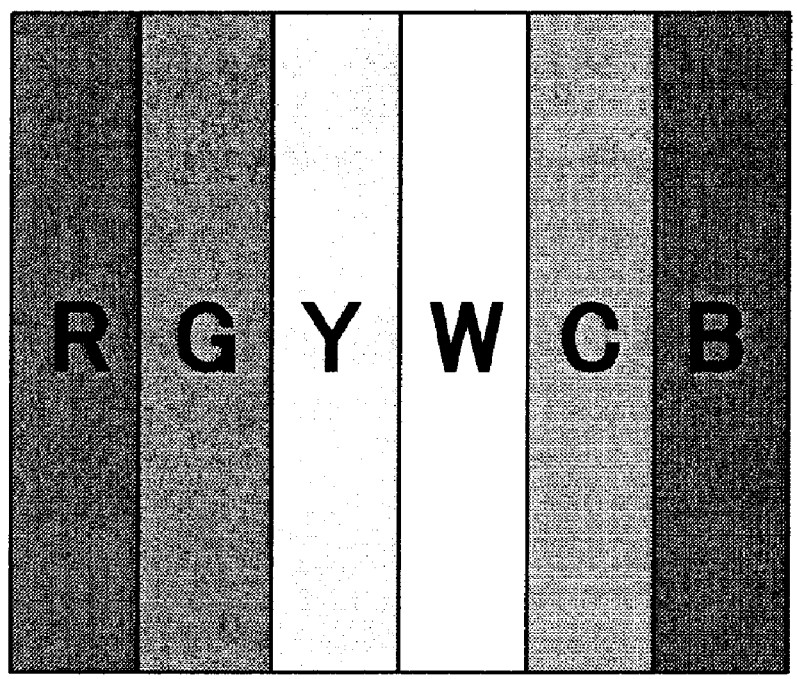

Fig.13-a
Prior Art
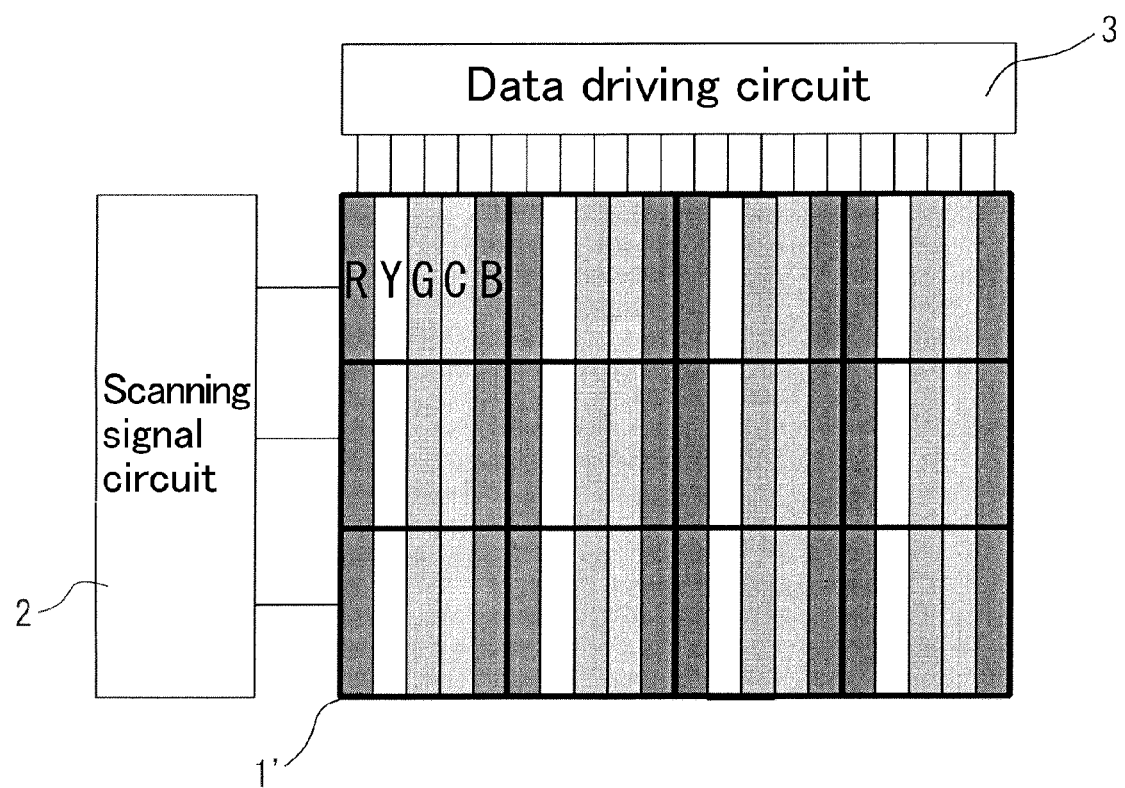

Fig.13-b
Prior Art
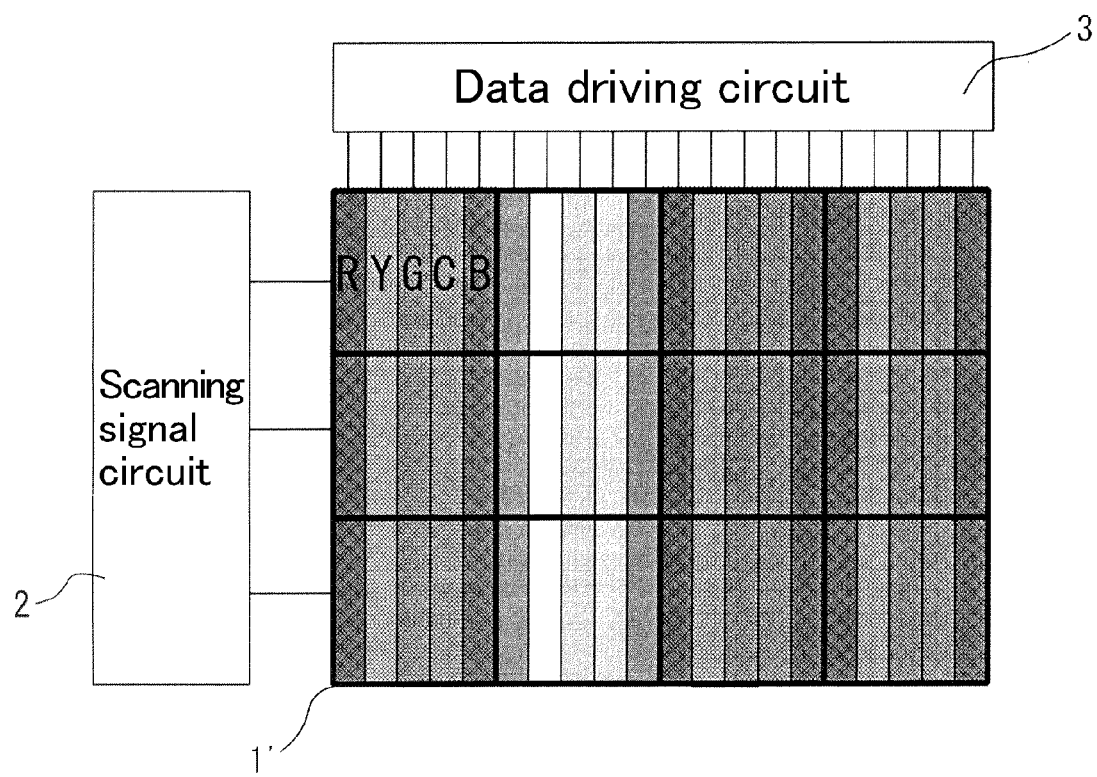
Fig.13-c
Prior Art
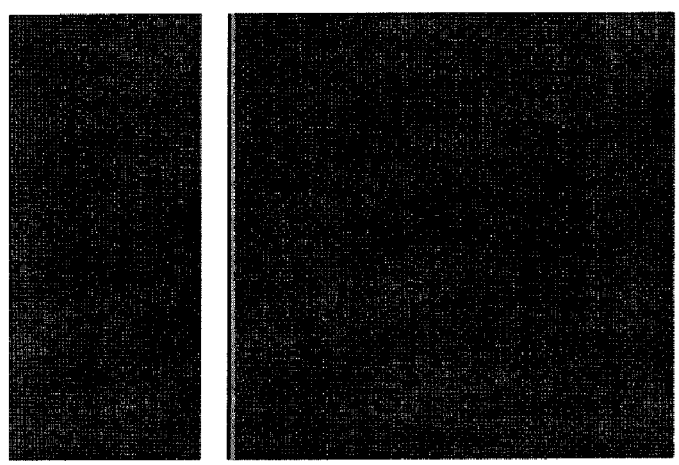

MULTI-PRIMARY COLOR DISPLAY DEVICE

BACKGROUND OF THE INVENTION

1. Field of the Invention

The present invention relates to display devices and liquid crystal display devices each including a display screen constituted by a plurality of pixels. More specifically, the present invention relates to a multi-primary color display device which can be used for various displays such as a liquid crystal display, a PDP (Plasma Display Panel), an Organic EL (Electroluminescent), a FED (Field Emission Display) by constituting an image using multi-primary colors, and also relates to a liquid crystal display device comprising such a display device.

2. Description of the Related Art

As display devices, various displays forming an image by pixels have been widely used as means for displaying information or images. Display devices in which one pixel is constituted by sub-pixels of three colors of RGB and thereby color display is provided are common. In such a color display technology, it has been recently considered that a color reproduction range is enlarged for improvement in display quality. For example, increase in color purity of three primary colors of RGB enlarges the color reproduction range in a chromaticity diagram. In this case, however, the brightness is reduced due to the increase in color density. In addition, a method of enlarging the color reproduction range in a liquid crystal display and the like by increasing the number of sub-pixels using four or more primary colors has been proposed.

As a technology relating to enlargement of the color reproduction range in a conventional display device, a liquid crystal display device in which each pixel of red, blue, green, and white is arranged in the row direction, and in the column direction, pixels with the same color are arranged is disclosed (for example, referring to Japanese Kokai Publication No. 2004-102292, pages 1, 2, and 22). In this liquid crystal display device, a method of adding W to the RGB three primary colors, thereby improving the brightness and the color reproduction range is proposed. Two color arrays of stripe array and matrix array have been proposed. The stripe array is commonly adopted in application of large displays such as TV, because of matching property with images. FIG. 11 shows an embodiment of this stripe array in a liquid crystal display device. In this case, R, G, B, and W are arranged in this order to form one pixel. In such a configuration, the color reproduction range can be larger, but G and W are separately recognized when one white line is displayed on a dark background. A liquid crystal display device in which a fine filter forming a color filter has four colors corresponding to a R-G axis and a B-Y axis is disclosed (for example, referring to Japanese Kokai Publication No. 2001-209047 (pages 1, 2, and 6)). However, in this liquid crystal display device, there is no disclosure that the four-color array is the stripe array.

A method of increasing the number of sub-pixels to five, or six, thereby increasing the number of colors, in order to more improve the color reproduction range has been proposed. For example, a five color sub-pixel configuration having an array shown in FIG. 12 is disclosed (for example, WO 03/088203 (pages 1, and 10 in Drawings) In this configuration, the sub-pixels constituting one pixel are arrayed in hue order of RYGCB. In such a configuration, the color reproduction can be larger, but B/C and Y are separately recognized when one white line is displayed on a black background. Therefore, there is room for improvement in order to improve display quality by achieving enlargement of the color reproduction range and suppression of the brightness reduction.

With respect to a liquid crystal display device performing color display using sub-pixels of at least four primary colors, it is disclosed that five primary colors of RGYBC are arranged as four sub-pixels of RGYB, CRGY, BCRG, YBCR, or GYBC (for example, referring to WO 02/101644 (pages 1, 2, and 9 in Drawings)). Also disclosed are a plasma display panel including pixels constituted by discharge cells of red, green, blue, and blue green as four primary colors (for example, referring to Japanese Kokai Publication No. 2004-152737 (pages 1 and 2), and a liquid crystal panel including sub-pixels in 2×3 arrays using six colors, as shown in FIG. 14 (for example, referring to "SID sokuhou", "online", May 26, 2004, Nikkei Business Publications, Inc. However, these display devices also have room for improvement in order to sufficiently suppress color separation phenomenon and the like in white line display, and thereby to improve basic performances in displays such as liquid crystal TVs for which excellent display quality is needed.

SUMMARY OF THE INVENTION

The present invention has been made in view of the above-mentioned state of the art. The present invention has an object to provide a display device which exhibits functional effects in which color separation between sub-pixels constituting pixel is hardly recognized and white line display is easily recognized as one line, in enlargement of the color reproduction range in image display using multi-primary colors, and thereby improves display quality, and to provide a liquid crystal display device including such a display device.

The present inventors have made various investigations on enlargement of the color reproduction range of display devices. The inventors noted that it is effective for enlargement of the color reproduction range of the display devices to increase the number of sub-pixels constituting one pixel and use four or more multi-primary colors. It is conventionally common that the sub-pixels are arrayed in hue order. However, the present inventors found that the color separation in one pixel can be prevented in a pixel including arranged sub-pixels of four or more colors by, based on a Y value (brightness value), arranging a sub-pixel having a higher Y value near the center of the pixel, for example. As a result, the above-mentioned problems have been admirably solved, leading to completion of the present invention.

That is, the present invention is a display device displaying an image constituted by pixels each including sub-pixels of four or more colors, wherein the pixels constituting the display device mainly include a pixel arranging a sub-pixel of a color having the highest brightness value in a central region of the pixel. In the present description, the terms "or more" and "or less" mean that the value described is included.

The stripe array and the matrix array are mentioned as a sub-pixel array method in such a display device. The stripe array is preferable because of reduction in drive frequency if the display device is actually used for liquid crystal TVs and the like. That is, it is preferable that sub-pixels constituting the pixel are arranged in a stripe pattern.

The above-mentioned display device enhances the functional effects of preventing color separation in white line display by prioritizing the Y value and arranging the sub-pixel having a higher brightness value in a central region of the pixel. In such a configuration, it is preferable that the display device includes a pixel including sub-pixels arranged in descending order of a brightness value from a central region to an end region of the pixel. It is effective for enhancement of the functional effects of the present invention that the sub-pixel of the color having the highest brightness value has a width larger than a width of each of other sub-pixels.

As the arrangement form in the case where the above-mentioned pixels constituting the display device include two or more different pixels, a lattice pattern may be mentioned. Particularly, it is preferable that if sub-pixels included in the pixel arranging the sub-pixel of the color having the highest brightness in the central region of the pixel are arranged in at least two different arrays, the two different arrays are arranged in a lattice pattern.

Hereinafter, primary colors constituting the sub-pixels are specifically mentioned, and the pixels constituting the display devices are explained. It is preferable that also these display devices are mainly constituted by a pixel in which a sub-pixel of a color having the highest brightness value is arranged in a central region of the pixel.

In a display device displaying an image constituted by pixels each including sub-pixels of five colors, the pixels constituting the display device include a pixel including sub-pixels arranged in order of R (red), G (green), Y (yellow), C (cyan), B (blue) or in order of R (red), C (cyan), Y (yellow), G (green), B (blue) in a stripe pattern. In this case, such a display device may have an embodiment in which the sub-pixel of Y has a width larger than a width of each of other four sub-pixels, and thereby the width of the sub-pixel having the highest brightness value is larger than that of the other sub-pixels.

In a display device displaying an image constituted by pixels each including sub-pixels of five colors, the pixels constituting the display device includes a pixel including sub-pixels arranged in order of R (red), G (green), W (white), Y (yellow), B (blue) or in order of R (red), Y (yellow), W (white), G (green), B (blue) in a stripe pattern. As a result, the functional effects of preventing color separation in white line display can be exhibited.

In a display device displaying an image constituted by pixels each including sub-pixels of four colors, the pixels constituting the display device includes a pixel including sub-pixels arranged in order of R (red), G (green), Y (yellow), B (blue) or in order of R (red), Y (yellow), G (green), B (blue) in a stripe pattern. In this case, it is preferable that the above-mentioned display device has a configuration in which the pixel including sub-pixels arranged in order of R (red), G (green), Y (yellow), B (blue) and the pixel including sub-pixels arranged in order of R (red), Y (yellow), G (green), B (blue) are arranged in a lattice pattern.

In a display device displaying an image constituted by pixels each including sub-pixels of four colors, the pixels constituting the display device includes a pixel including sub-pixels arranged in order of R (red), W (white), G (green), B (blue) or in order of R (red), G (green), W (white), B (blue) in a stripe pattern. In this case, it is preferable that the above-mentioned display device has a configuration in which the pixel including sub-pixels arranged in order of R (red), W (white), G (green), B (blue) and the pixel including sub-pixels arranged in order of R (red), G (green), W (white), B (blue) are arranged in a lattice pattern.

In a display device displaying an image constituted by pixels each including sub-pixels of six colors, wherein the pixels constituting the display device include a pixel including: sub-pixels arranged in order of R(red), G (green), B (blue), or in order of B (blue), G (green), R (red); and sub-pixels arranged in order of M (magenta), Y (yellow), C (cyan), or in order of C (cyan), Y (yellow), M (magenta), the sub-pixels being arranged in a matrix pattern, Y as a sub-pixel of a color having the highest brightness value is arranged in a central region of the pixel including the sub-pixels arranged in a matrix pattern, and G as a sub-pixel of a color having the second-highest brightness value is also arranged in a central region of the pixel. For example, if the matrix array is constituted by 2×3 arrays including two arrays in the column (lengthwise) direction and three arrays in the row (widthwise) direction, sub-pixels in one array of two arrays in the row direction are arranged in order of R (red), G (green), B (blue), or B (blue), G (green) R (red), and sub-pixels in the other array are arranged in order of M (magenta), Y (yellow), C (cyan), or C (cyan), Y (yellow), M (magenta). If the matrix array is constituted by 3×2 arrays including three arrays in the column (lengthwise) direction and two arrays in the row (widthwise) direction, sub-pixels in one of two arrays in the column direction are arranged in order of R (red), G (green), B (blue) or B (blue), G (green), R (red), and sub-pixels in the other array are arrange in order of M (magenta), Y (yellow), C (cyan) or C (cyan), Y (yellow), M (magenta).

Also in this case, it is preferable that the display device is configured by arranging two or more different pixels constituted in different sub-pixel array patters in a lattice pattern.

In the embodiment in which the device includes the pixels formed in a matrix array, the array pattern such as 2×3 arrays and 3×2 arrays is appropriately determined in such a way that a sub-pixel of a color having the highest brightness value is arranged in a central region of the pixel formed in a matrix array, and the embodiment is not limited to the above-mentioned configuration.

A liquid crystal display device configured to have the above-mentioned sub-pixel array pattern enlarges the color reproduction range, and has basic performances excellent in brightness or display quality. Therefore, such a liquid crystal display device can be preferably applied for liquid crystal TVs, as a liquid crystal display. That is, the present invention includes a liquid crystal display device displaying an image constituted by pixels each including sub-pixels of four or more colors, wherein the liquid crystal display device has a sub-pixel array pattern in the display device.

Each of the display device and the liquid crystal display device of the present invention essentially has the above-mentioned configuration and includes components which display devices generally include. Other configurations of the display device and the liquid crystal display device are not especially limited.

The above-mentioned display device has the above-mentioned configuration, and therefore, exhibits functional effects in which color separation between sub-pixels constituting a pixel is hardly recognized and white line display is easily recognized as one line, in enlargement of the color reproduction range in image display and improvement in the brightness using four or more multi-primary colors, and thereby improves display quality. Therefore, such a display device can preferably used for various displays such as a liquid crystal TV as a multi-primary color display device.

BRIEF DESCRIPTION OF THE DRAWINGS

FIG. 1-a shows a pixel constituting a five-primary color (RGYCB) display device in accordance with one embodiment of the present invention, and is a schematic view showing an array of five sub-pixels constituting one pixel.

FIG. 1-b shows the pixel constituting the five-primary color (RGYCB) display device in accordance with one embodiment of the present invention, and is a graph schematically showing a relationship between the Y value and the sub-pixel array.

FIG. 1-c shows a pixel constituting a five-primary color (RCYGB) display device in accordance with one embodiment of the present invention, and is a schematic view showing an array of five sub-pixels constituting one pixel.

FIG. 1-d shows the pixel constituting the five-primary color (RCYGB) display device in accordance with one embodiment of the present invention, and is a graph schematically showing a relationship between the Y value and the sub-pixel array.

FIG. 2-a shows a pixel constituting a five-primary color (RGWYB) display device in accordance with one embodiment of the present invention, and is a schematic view showing an array of five sub-pixels constituting one pixel.

FIG. 2-b shows a pixel constituting a five-primary color (RYWGB) display device in accordance with one embodiment of the present invention, and is a schematic view showing an array of five sub-pixels constituting one pixel.

FIG. 3-a is a view showing a circuit configuration of a five-primary color (RGYCB) display device in accordance with one embodiment of the present invention, and is a schematic view showing display of only white color.

FIG. 3-b is a view showing a circuit configuration of the five-primary color (RGYCB) display device in accordance with one embodiment of the present invention, and is a schematic view showing white line display.

FIG. 3-c is a view showing a circuit configuration of the five-primary color (RGYCB) display device in accordance with one embodiment of the present invention, and is a schematic view showing a screen display in FIG. 3-b.

FIG. 4-a shows a pixel constituting a four-primary color (RWGB) display device in accordance with one embodiment of the present invention, and is a schematic view showing an array of four sub-pixels constituting one pixel.

FIG. 4-b shows the pixel constituting the four-primary color (RWGB) display device in accordance with one embodiment of the present invention, and is a graph schematically showing a relationship between the Y value and the sub-pixel array.

FIG. 4-c shows a pixel constituting a four-primary color (RGNB) display device in accordance with one embodiment of the present invention, and is a schematic view showing an array of four sub-pixels constituting one pixel.

FIG. 4-d shows the pixel constituting the four-primary color (RGWB) display device in accordance with one embodiment of the present invention, and is a schematic view showing a relationship between the Y value and the sub-pixel array.

FIG. 5-a shows a pixel constituting a six-primary color (MRGYCB) display device in accordance with one embodiment of the present invention, and is a schematic view showing an array of six sub-pixels constituting one pixel.

FIG. 5-b shows a pixel constituting a six-primary color (MRYGCB) display device in accordance with one embodiment of the present invention, and is a schematic view showing an array of six sub-pixels constituting one pixel.

FIG. 6 shows a pixel constituting a six-primary color (MGYWCB) display device in accordance with one embodiment of the present invention, and is a schematic view showing an array of six sub-pixels constituting one pixel.

FIG. 13-a is a view showing a circuit configuration of the conventional five-primary color (RYGCB) display device, and is a schematic view showing display of only white color.

FIG. 13-b is the view showing a circuit configuration of the conventional five-primary color (RYGCB) display device, and is a schematic view showing white line display.

FIG. 13-c is the view showing a circuit configuration of the conventional five-primary color (RYGCB) display device, and is a schematic view showing a display screen in FIG. 13-b.

DETAILED DESCRIPTION OF THE PREFERRED EMBODIMENTS

The display device or the liquid crystal display device is mentioned in more detail below with reference to best modes for carrying out the invention, using drawings. However, the present invention is not limited to only these Embodiments.

FIG. 1 shows pixels constituting a five-primary color display device in accordance with one embodiment of the present invention. The display device is a display device in which one pixel is constituted by sub-pixels of five colors of R, Y, G, B, and C, and the five sub-pixels are arranged in a stripe pattern. The sub-pixels are arranged in order of R, G, Y, C, B or in order of R, C, Y, G, B. The array of the five sub-pixels constituting one pixel and the relationship between the Y value and the sub-pixel array in this case are shown in FIGS. 1-a and 1-b, and FIGS. 1-c and 1-d. It is preferable in the present embodiment that the Y sub-pixel has a width larger than that of each of the other four sub-pixels.

In addition, embodiments of pixels constituting a five primary color display device of the present invention also include an embodiment in which, in a display device in which one pixel is constituted by sub-pixels of five colors of R, Y, G, B, and W and the five sub-pixels are arranged in a stripe pattern, the sub-pixels are arranged in order of R, G, W, Y, B or R, Y, W, G, B. The sub-pixel arrangement in accordance with this embodiment is shown in FIGS. 2-a and 2-b.

As shown in FIGS. 1-a and 1-b, and FIGS. 1-c and 1-d, the sub-pixels are arranged based on the Y value (brightness value), and the sub-pixel having a higher Y value is arranged near the center of the pixel. In this case, Y as a sub-pixel of a color having the highest Y value is arranged in the center of the five sub-pixels arranged in a stripe pattern, and the five sub-pixels are arranged in descending order of the Y value from the center to ends. As a result, the functional effect of preventing color separation inside one pixel can be exhibited.

Figure 12:
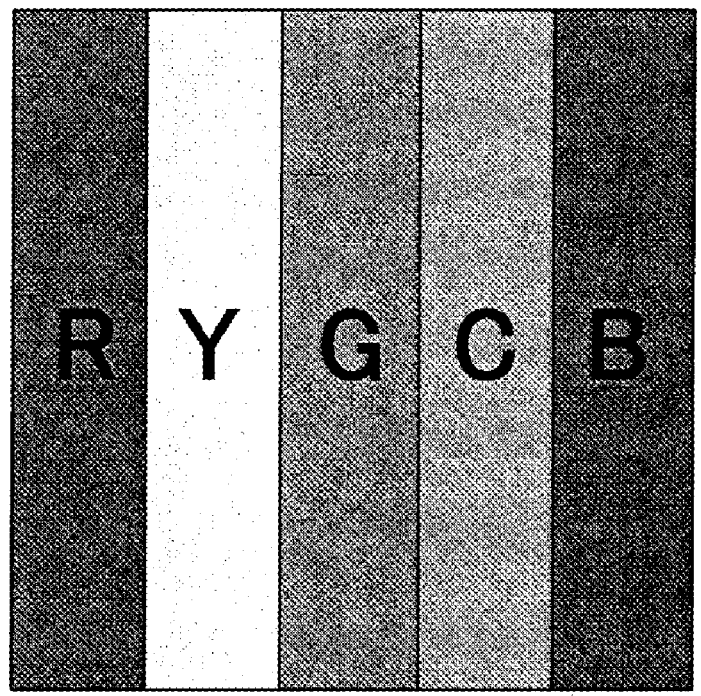
FIG. 12 shows a pixel constituting a conventional five-primary color (RYGCB) display device, and is a schematic view showing an array of five sub-pixels constituting one pixel.
Figure 14:
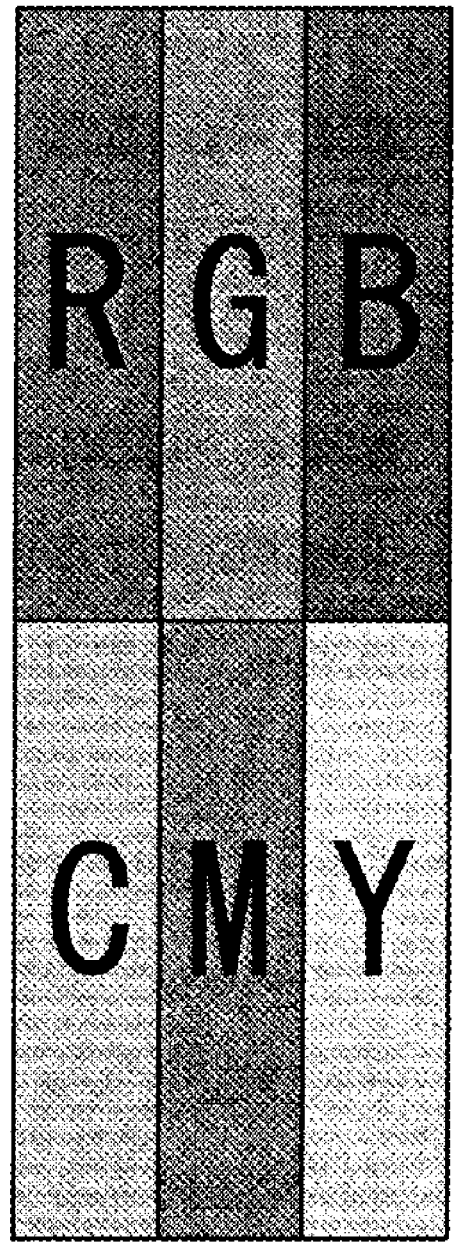
FIG. 14 shows a pixel constituting a conventional six-primary color (RGBCMY) display device, and is a schematic view showing a matrix array.

In contrast, it is conventionally common that the sub-pixels are arranged in hue order, as shown in FIG. 12. In this case, B or C, and Y are separately recognized when one white line is displayed on a dark background. In use of five colors as in the present embodiment, the sub-pixels are arrayed not in hue order RYGCB, but in order of RGYCB or RCYGB. As a result, the color separation in white line display is eliminated and the display quality can be improved.

FIG. 3 is a schematic view showing a circuit configuration of a five-primary color (RGYCB) display device in accordance with one embodiment of the present invention. In this case, pixels are formed on a substrate (1), and a signal for displaying an image is transmitted to each pixel by a scanning signal circuit (2) and a data driving circuit (3). In FIGS. 3-a and 3-b, four pixels are arranged in the row (widthwise) direction and three pixels are arranged in the column (lengthwise) direction, and each pixel has a sub-pixel arrangement pattern of RGYCB (only in the upper left pixel, RGYCB is described, but the other pixels also have the same pattern.)

FIG. 3-a shows display of only white color, and each pixel is in a state of displaying white. FIG. 3-b shows white line display, and the pixels in one array in the column (lengthwise) direction are in a state of displaying white such that one white line is displayed in the column (lengthwise) direction. In FIG. 3-b, the pixels not in a state of displaying a white line are schematically indicated by shading.

FIG. 3-c is a schematic view showing a screen display in FIG. 3-b, and shows a state where a white line is displayed on a black background. In FIG. 3, one pixel is constituted by sub-pixels in a RGYCB array, and such a pixel constitutes all of the pixels on the substrate (1). In the present embodiment, the sub-pixel having a high Y value is arranged in the center of the pixel, and therefore, color separation is hardly generated, and the white line is easily recognized as one line.

FIG. 13 is a schematic view showing a circuit configuration of a conventional display device. Also in this case, the signal is transmitted to each pixel as mentioned above. FIG. 13-a shows display of only white color. FIG. 13-b shows white line display. FIG. 13-c shows a screen display in FIG. 13-b. In FIG. 13, one pixel is constituted by sub-pixels in a RYGCB array, and such a pixel constitutes all of the pixels on a substrate (1').

In such a conventional display device, a Y line consisting of RYG is separated from a B line consisting of CB.

FIG. 4 shows pixels constituting a four primary color display device in accordance with one embodiment of the present invention. The display device is a display device in which one pixel is constituted by sub-pixels of four colors of R, W, G, and B, and the four sub-pixels are arranged in a stripe pattern. The pixels have an embodiment in which the sub-pixels are arranged in order of R, W, G, B, or in order of R, G, W, B. The array of the four sub-pixels constituting one pixel and the relationship between the Y value and the sub-pixel array in this case are shown in FIGS. 4-a and 4-b, and FIGS. 4-c and 4-d.

In addition, embodiments of pixels constituting a four primary color display device of the present invention also include an embodiment in which, in a display device in which one pixel is constituted by sub-pixels of four colors of R, Y, G, and B, and the four sub-pixels are arranged in a stripe pattern, the sub-pixels are arranged in order of R, G, Y, B or R, Y, G, B.

As shown in FIGS. 4-a and 4-b, and FIGS. 4-c and 4-d, the sub-pixels are arranged based on the Y value (brightness value), and the sub-pixel having a higher Y value is arranged near the center of the pixel. In this case, W as a sub-pixel of a color having the highest Y value is arranged in one of two central regions of the four sub-pixels arranged in a stripe pattern, and G having the second-highest Y value is arranged in the other central region, and thereby the four sub-pixels are arranged in descending order of the Y value from the central regions to ends. As a result, the functional effect of preventing color separation inside one pixel can be exhibited.

Figure 11:
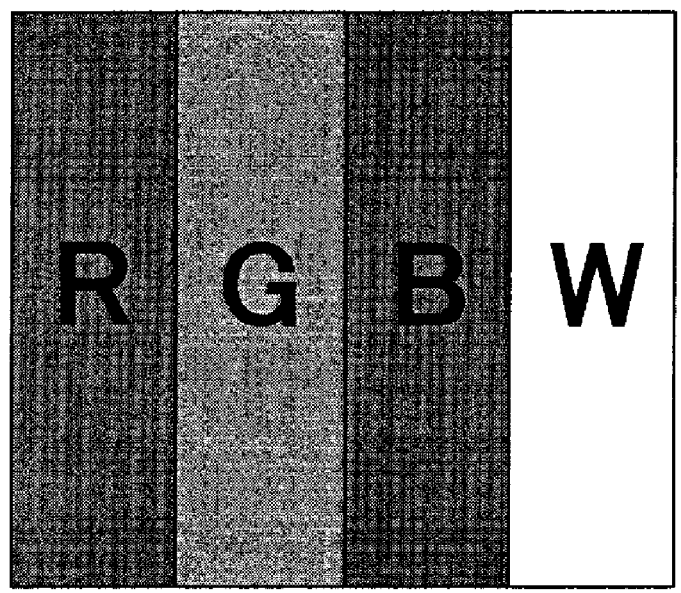
FIG. 11 shows a pixel constituting a conventional four-primary color (RGBW) display device, and is a schematic view showing an array of four sub-pixels constituting one pixel.
Figure 11:
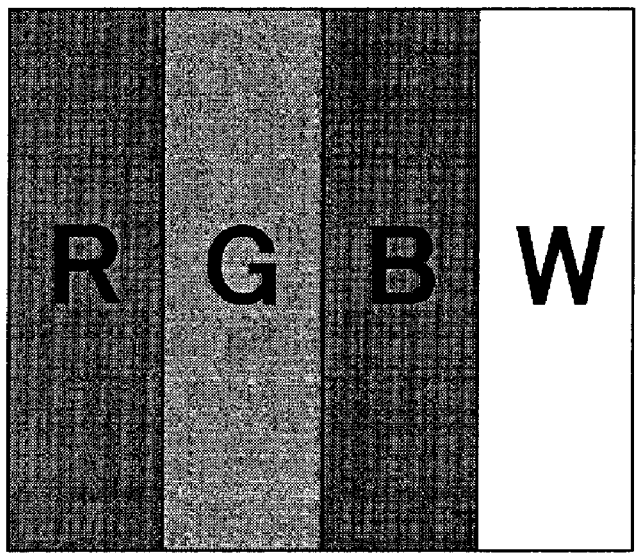

In contrast, the position of the sub-pixel W is ignored conventionally, as shown in FIG. 11. Therefore, when one white line is displayed on a dark background, the line is separately recognized. In use of four colors as in the present embodiment, the sub-pixels are arrayed not in hue order of RGBW, but in order of RWGB or RGWB. As a result, the display quality can be improved.

In use of six colors of sub-pixels, it is preferable that the sub-pixels are arranged not in hue order of RYGCBM, but in order of MRGYCB or MRYGCB, as shown in FIGS. 5-a and 5-b. M represents magenta. In use of six colors including W, an embodiment of RGYWCB is preferable as shown in FIG. 6. As mentioned above, the sub-pixel array according to the present invention, in which the sub-pixel having a higher Y value is arranged in the central region of the pixel, can be applied for the embodiment in which sub-pixels of four or more colors are used in one pixel.

For the central region of the pixel in these embodiment, if the number of sub-pixels is an even number such as four and six, it is preferable that a sub-pixel of a color having the highest Y value is arranged as one of two sub-pixels positioned in the center of the pixel and a sub-pixel of a color having the second-highest Y value is arranged as the other sub-pixel positioned in the center of the pixel. If the number of sub-pixels is an odd number such as five, it is preferable that a sub-pixel of a color having the highest Y value is arranged as one sub-pixel positioned in the center of the pixel.

Figure 7:
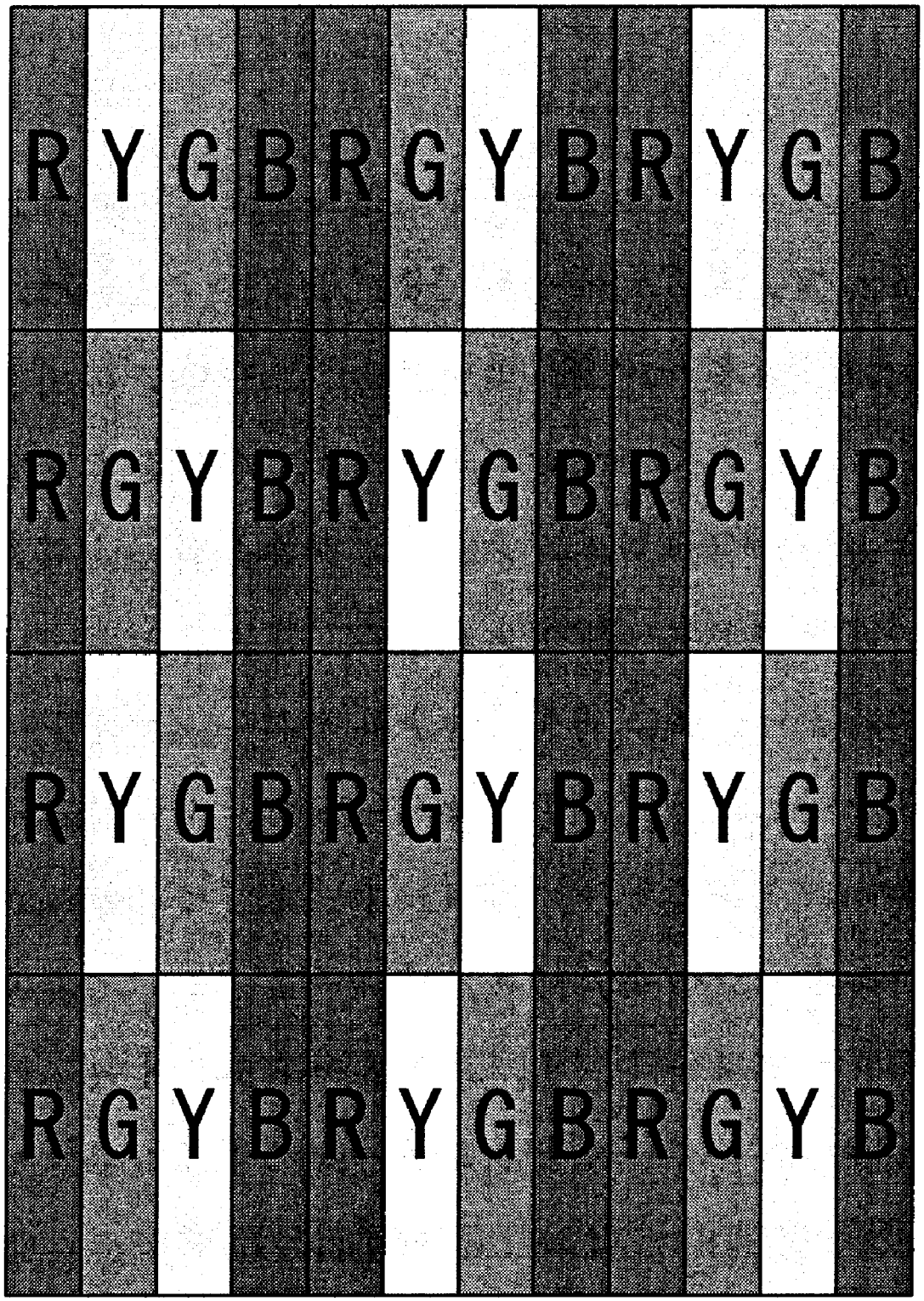
FIG. 7 shows an arrangement of pixels constituting a four-primary color (RGYB and RYGB) display device in accordance with one embodiment of the present invention, and is a schematic view showing a lattice-patterned arrangement.
Figure 8:
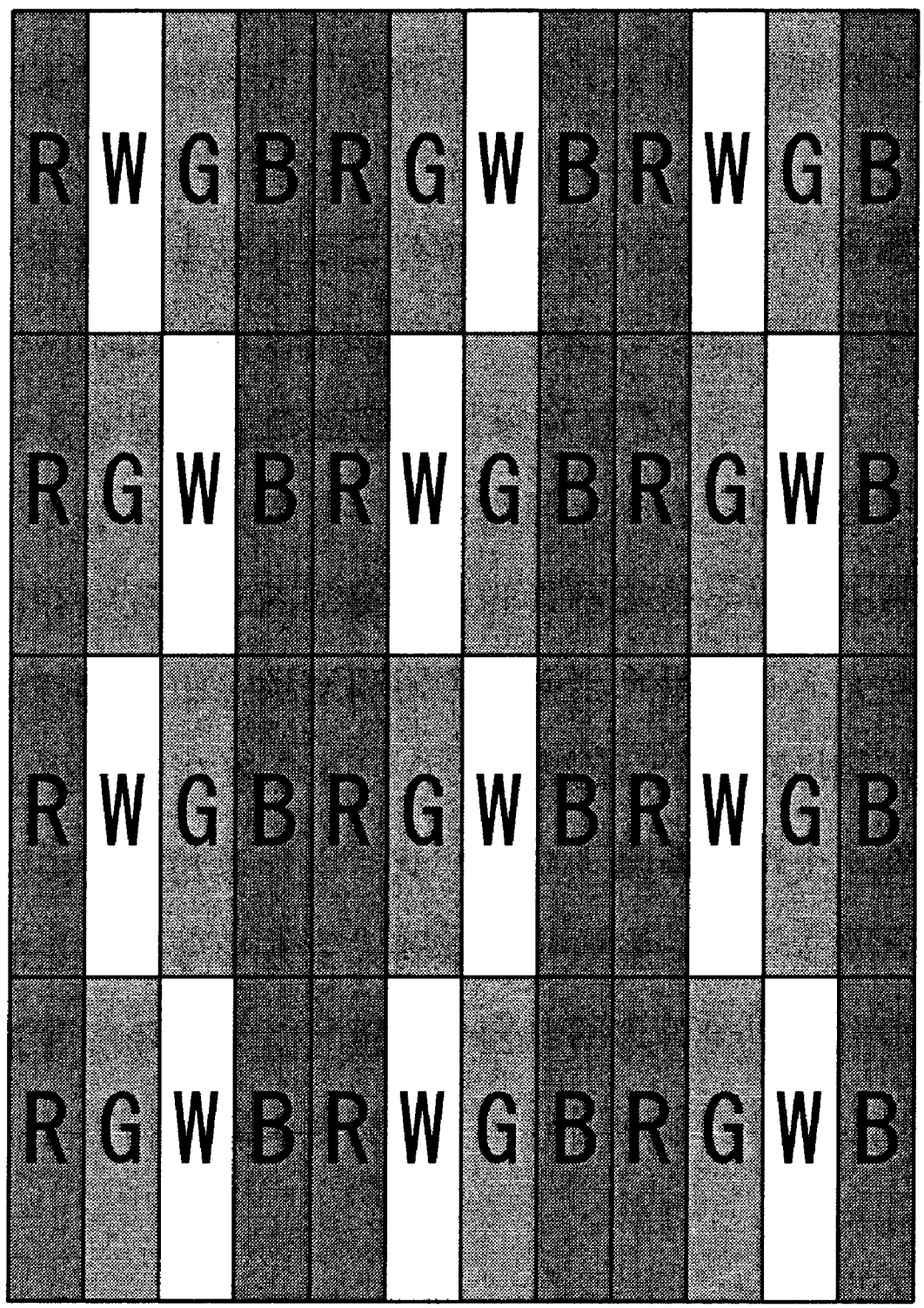
FIG. 8 shows an arrangement of pixels constituting a four-primary color (RWGB and RGWB) display device in accordance with one embodiment of the present invention, and is a schematic view showing a lattice-patterned arrangement.

FIG. 7 schematically shows an arrangement configuration of a plurality of pixels forming an image in a display device in which four sub-pixels constituting one pixel are arranged in a stripe shape, and the sub-pixels are arranged in order of RGYB or RYGB. In this case, the array pixel of RGYB and the array pixel of RYGB are arranged alternately in row and column directions, i.e. in a lattice pattern. FIG. 8 schematically shows an arrangement configuration of a plurality of pixels forming an image in a display device in which sub-pixels are arranged in order of RWGB or RGWB. In this case, the array pixel of RWGB and the array pixel of RGWB are arranged alternately in row and column directions, i.e. in a lattice pattern.

As shown in these embodiment, if the two or more combinations are used as the sub-pixel array, two or more different pixels are arranged, i.e. in a lattice pattern in such a way that pixels adjacently arranged in row and column directions have different sub-pixel arrays. As a result, the display quality can be improved.

Figure 9:
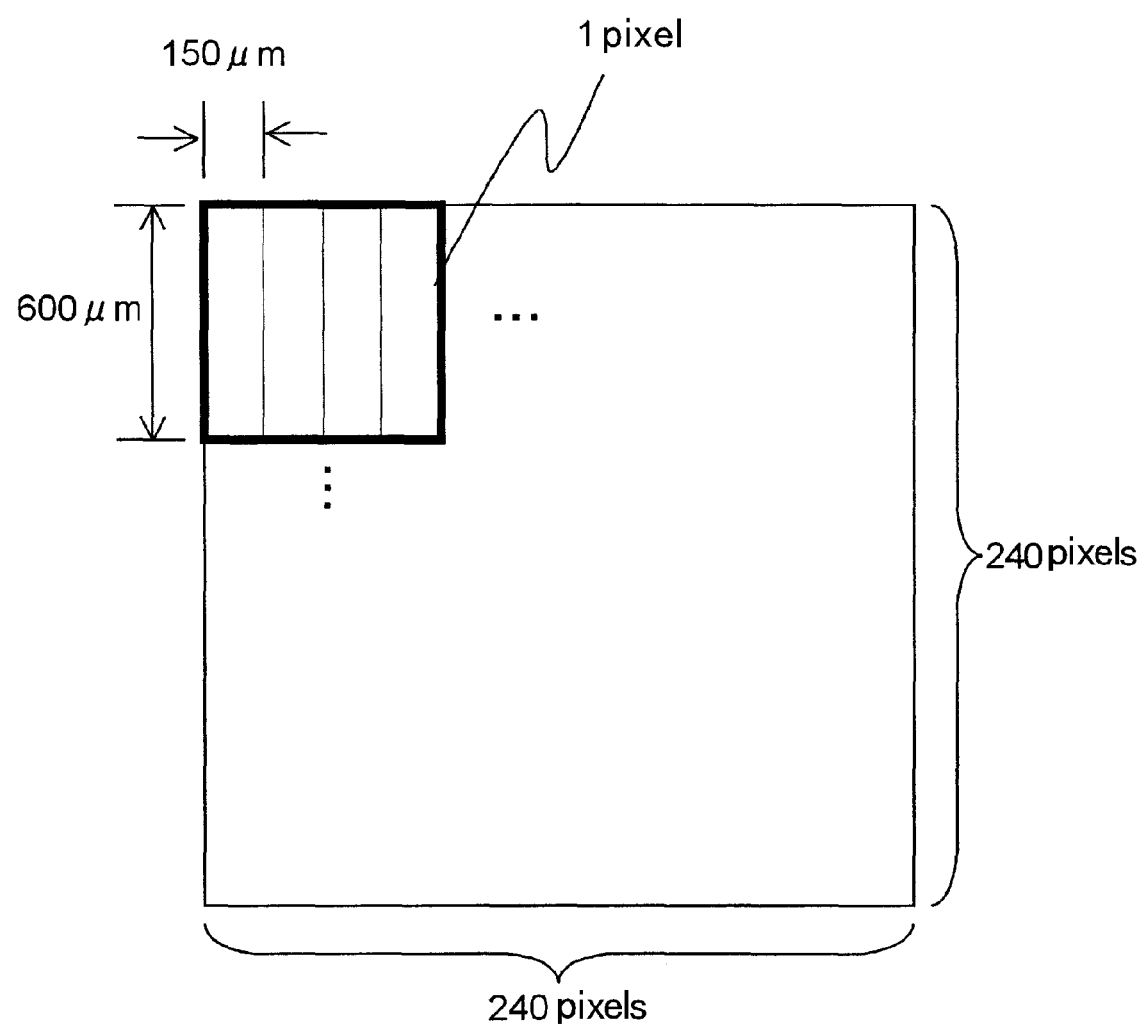
FIG. 9 is a schematic view showing a substrate configuration in accordance with embodiments of the present invention.

The brightness of the sub-pixel can be measured from the normal direction of the substrate, with a viewing angle of 2° and a measurement area about 30 mm φ in the substrate normal direction, in a dark room, using a spectroradiometer SR-3 produced by TOPCON CORP. The present embodiment adopts a substrate constituted by 240×240 pixels each of which includes four sub-pixels having one side of 600 μm and the other side of 150 μm, as shown in FIG. 9.

In such a substrate configuration, the substrate is constituted by a pixel in which a sub-pixel of a higher Y value is arranged in a central region of the pixel (Y value-based pixel) according to the present embodiment. It is preferable that all pixels constituting the substrate are such Y value-based pixels. However, the substrate may have an embodiment in which some pixels are not Y value-based pixels, as long as the color separation in white line display hardly occurs. In the embodiment in which some pixels are not Y value-based pixels, the Y value-based pixels mainly constitutes the substrate. In this case, the pixels constituting the substrate are substantially constituted by the Y value-based pixels, not mainly using a pixel including sub-pixels conventionally arranged without consideration of the Y value, but mostly using a pixel including sub-pixels arranged in consideration of the Y value.

Figure 10:
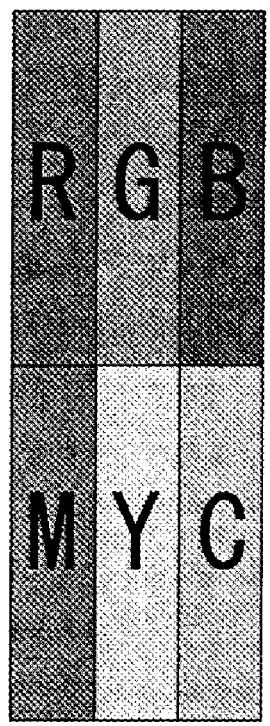
FIG. 10 shows a pixel constituting a six-primary color (RGBMYC) display device in accordance with one embodiment of the present invention, and is a schematic view showing a matrix array.

In accordance with one embodiment of the present invention, a matrix array may be mentioned as embodiments other than the stripe array. Also in the matrix array, a sub-pixel of a color having the highest Y value is arranged in a central region of the pixel. For example, in 2×3 arrays using sub-pixels of six colors, Y is arranged in one of two sub-pixels positioned in the center of the upper and lower three arrays. If sub-pixels of six colors of RGBMYC are used as shown in FIG. 10, Y having the highest Y value and G having the second-highest Y value are arranged in the central regions of the upper and lower three arrays, respectively. As a result, the sub-pixels of the colors each having a higher Y value are substantially arranged in the central regions of the pixel, and the functional effects of the present invention can be exhibited.

The display device of the present embodiments is a display device in which an image is constituted by a plurality of pixels and display is performed using multi-primary colors. Such a display device can be widely used for color display technology in multi-primary color display devices in which one pixel is constituted by a plurality of sub-pixels (picture elements), and can be preferably used for liquid crystal display devices such as a liquid crystal TV, and various displays such as a PDP, an organic EL, and a FED, for example.

This Nonprovisional application claims priority under 35 U.S.C. §119(a) on Patent Application No. 2004-240020 filed in Japan on Aug. 19, 2004, the entire contents of which are hereby incorporated by reference.

The invention claimed is:

1. A display device displaying an image constituted by pixels each including sub-pixels of four colors; wherein
the pixels constituting the display device includes a pixel including sub-pixels arranged in order of R (red), W (white), G (green), B (blue) or in order of R (red), G (green), W (white), B (blue) in a stripe pattern; and
the pixel including sub-pixels arranged in order of R (red), W (white), G (green), B (blue) and the pixel including sub-pixels arranged in order of R (red), G (green), W (white), B (blue) are arranged in a lattice pattern.

2. A liquid crystal display device displaying an image constituted by pixels each including sub-pixels of four or more colors,
wherein the liquid crystal display device has a sub-pixel array pattern in the display device of claim 1.

* * * * *